United States Patent [19]
Harrison et al.

[11] 3,725,348

[45] Apr. 3, 1973

[54] POLYESTER MODIFIED WITH METAL SALTS OF SULFOISOPHTHALIC ACID ESTERS AND POLY(ETHYLENE OXIDE) END CAPPED WITH ALKYL GROUPS

[75] Inventors: Albert Keith Harrison; John Mather, Harrogate, England

[73] Assignee: Imperial Chemical Industries Limited, London, England

[22] Filed: Dec. 23, 1970

[21] Appl. No.: 101,118

Related U.S. Application Data

[63] Continuation of Ser. No. 783,419, Dec. 12, 1968, abandoned.

[30] Foreign Application Priority Data

Dec. 5, 1967 Great Britain......................55,313/67

[52] U.S. Cl..................260/75 S, 8/179, 260/33.2 R, 260/49

[51] Int. Cl..........................C08g 17/14, C08g 17/18
[58] Field of Search........260/75 S, 75 R, 49, 33.2 R; 8/179

[56] References Cited

UNITED STATES PATENTS

| | | | |
|---|---|---|---|
| 3,018,272 | 1/1962 | Griffing et al. | 260/75 |
| 3,033,824 | 5/1962 | Huffman | 260/75 |
| 3,557,039 | 1/1971 | McIntyre et al. | 260/29.2 |

*Primary Examiner*—William H. Short
*Assistant Examiner*—L. L. Lee
*Attorney*—Stephen D. Murphy

[57] ABSTRACT

Copolyesters of improved affinity for dyestuffs are manufactured by incorporating a poly(alkylene oxide) into a copolyester of which a proportion of the structural units are organic radicals containing at least one sulphonate group as the metal salt.

4 Claims, No Drawings

POLYESTER MODIFIED WITH METAL SALTS OF SULFOISOPHTHALIC ACID ESTERS AND POLY(ETHYLENE OXIDE) END CAPPED WITH ALKYL GROUPS

This application is a continuation of Ser. No. 783,419, filed Dec. 12, 1968, and now abandoned.

This invention relates to copolyesters of improved affinity towards basic dyestuffs.

According to the present invention we provide an improved, film- or fiber-forming copolyester in which a minor proportion of the structural units are organic radicals containing at least one sulphonate group in the form of the metal salt and in which is incorporated a minor proportion of at least one poly(alkylene oxide).

By a minor proportion of the structural units we mean from 0.5 to 10 units per 100 total units.

By a minor proportion of a poly(alkylene oxide) or the poly(alkylene oxides) we mean from 1 to 15 percent by weight on the total mixture.

The copolyesters used in our invention may be made by a variety of methods of which the following may be taken as examples:

a. The reaction of a dicarboxylic acid with a diol and a minor proportion of a sulphonated dicarboxylic acid and/or a sulphonated diol; the metal salt of the sulphonate group may be formed before, during or after the polyester-forming reaction.

b. The reaction of more than one dicarboxylic acid with a diol, or more than one diol with a dicarboxylic acid, in the presence of a minor proportion of a sulphonated dicarboxylic acid and/or of a sulphonated diol; the metal salt of the sulphonate group may be formed before, during or after the polyester-forming reaction.

c. The preparation of a low-molecular weight polyester or copolyester free from structural units bearing a sulphonate group, followed by the addition to the reaction mixture of a sulphonated dicarboxylic acid, a sulphonated diol or a low molecular weight polyester containing structural units which are substituted with at least one sulphonate group, or a mixture of two or all of these, and further polycondensation to yield a product of the desired molecular weight; the metal salt of the sulphonate group may be formed before, during or after the polycondensation.

For the dicarboxylic acid or diols in (a), (b) or (c) may be substituted suitable derivatives which are known for the preparation of polyesters.

In the preparation of the copolyester, a proportion of the dicarboxylic acid may be substituted by a hydroxycarboxylic acid or a second dicarboxylic acid.

Suitable dicarboxylic acids for use in the preparation of the copolyesters of our invention are, for example, terephthalic acid and bis(para-carboxyphenoxy)ethane. Examples of dicarboxylic acids which may be employed conjointly with the main dicarboxylic acid in preparing the products of our invention are isophthalic acid, adipic acid and sebacic acid. Preferably not less than 75 percent of the units of the polyester should be ethylene terephthalate units or not less than 75 percent should be ethylene bis(paracarboxyphenoxy)ethane units.

Among glycols suitable for the preparation of the copolyesters of our invention are glycols of the formula $HO(CH_2)_nOH$ where n is not less than 2 and not greater than 10 and 1:4 bis(hydroxymethyl) cyclohexane.

The poly(alkylene oxide), of which each of the endgroups may be hydroxyl or alkyl, may be incorporated into the copolyester by any appropriate or convenient method, that is at any stage in the preparation of the copolyester or its formation into shaped articles thereafter which is appropriate or convenient. The following methods may be taken as examples:

i. The poly(alkylene oxide) may be added together with any of the raw materials for the formation of the copolyester or during their reaction; in the case where either or both of the end-groups of the poly(alkylene oxide) is hydroxyl the poly(alkylene oxide) is preferably added when the preparation of the copolyester is complete in order to avoid reaction of the hydroxyl group in an ester-forming reaction.

ii. The poly(alkylene oxide) may be added to the copolyester, which may then either be directly formed into shaped articles or converted into a convenient solid form which may later be remelted for formation into shaped articles. This represents a compromise between method (i) involving a longer time of contact of the poly(alkylene oxide) with the copolyester and method (iii) wherein separate equipment is required.

iii. The poly(alkylene oxide) may be applied to the molten stream of copolyester whilst it is being formed into shaped articles. This has the advantage that the poly(alkylene oxide) is in contact with molten copolyester for a short time only, and undesirable side effects are less likely.

iv. The poly(alkylene oxide) may be applied to the shaped articles, either as such or during or after further processing, for example, in the form of textiles.

The poly(alkylene oxide) may be of molecular weight from 500 to 20,000 but preferably it should be of molecular weight from 500–6,000.

In general it is preferred that the metal salt of the sulphonate group should be formed of an alkali metal or an alkaline earth metal, although other metals may be used.

Particularly useful are copolyesters based on ethylene terephthalate units.

The admixed copolyesters may additionally contain other additives commonly added to polyesters and in the amounts commonly used. In particular we have found the presence of an antioxidant and a stabilizer against adverse effects of irradiation to be beneficial.

The admixed copolyesters of our invention may be processed into fibers by any known process. The fibers so formed possess affinity towards basic dyestuffs superior to that of the fibers from the copolyester without admixed poly(alkylene oxide) and also superior to those from polyesters having no sulphonate-containing units but containing admixed poly(alkylene oxide) in equivalent amount.

In order that the process of our invention should be the more fully understood, we give hereinafter examples of methods in which it may where put into practice. In these examples, all parts are by weight. By Viscosity Ratio we mean the ratio $\eta/\eta$ where $\eta$ is the viscosity of the solution of polymer and $\eta$ is the viscosity of the pure solvent. Determinations of Viscosity Ratio were carried out in orthochlorophenol at 25°C at a concentration of 1 g. of polymer to 100 ml. of solvent.

EXAMPLE 1

A mixture of dimethyl terephthalate (194 parts), ethylene glycol (155 parts) and manganese acetate (0.0486 parts) was heated at a temperature of 220° C for 1 ½ hours, after which time the theoretically obtainable quantity of methanol for full reaction had distilled off from the mixture. To the resultant reaction mixture there were added antimony trioxide (0.078 parts) and triphenyl phosphite (0.26 parts) and the resultant mixture heated for 3 hours at 284°C under an atmosphere of nitrogen at a pressure of 0.2 mm of mercury, under normal polycondensation conditions. The resultant polyester had Viscosity Ratio 1.6, as determined as described hereinbefore.

A portion of the polyester so obtained was dried at 135° C for 3 hours, formed into a candle at 220° C and melt-spun into fibers. The resultant fibers were drawn over a pin at 85° C and a plate at 165° C, using a draw ratio of 4.0 to 1.

The drawn fiber (100 parts) was subjected to dyeing at 100° C for 1 hour in a dyebath of the composition:

| | |
|---|---|
| Dyestuff of Color Index Red 14 | 12.5 parts |
| Sodium sulphate | 600 parts |
| Water | 7,500 parts | and containing diphenyl (0.5 parts per 100 ml. of dye liquor) as carrier. Only a very weak shade of dyeing was obtained.

EXAMPLE 2

A copolyester was prepared by following the procedure of Example 1 exactly, with the distinction that immediately prior to the polycondensation stage there were added to the reaction mixture sodium dimethyl 5-sulphoisophthalate (5.92 parts) and poly(ethylene oxide) of molecular weight 1540 which was double end-stopped with methyl groups. The resultant copolyester thus contained sulphonate bearing units and was admixed with poly(ethylene oxide). The resultant copolyester admixture was spun and drawn as described in Example 1 and subjected to the same dyeing conditions with the same dyestuff. A deep shade of dyeing was obtained.

EXAMPLE 3

Comparative experiments were carried out adding on the one hand dimethyl-5-sulphoisophthalate (5.92 parts) only and on the other poly(ethylene oxide) of molecular weight 1540 which was double end stopped with methyl groups. These experiments showed that the fibers of Example 2 had greater affinity towards the basic dyestuff than would be expected from the additive effect of linkages derived from dimethyl-5-sulphoisophthalate and the admixture of the poly(ethylene oxide), showing a synergistic effect of the two factors.

What is claimed is:

1. An improved, dye-receptive copolyester fiber, wherein:
   a. the fiber-forming material of said copolyester consists essentially of the product of the process of reacting:
      1. an acid selected from the group consisting of terephthalic acid and bis(para-carboxyphenoxy)ethane,
      2. A glycol selected from the group consisting of ethylene glycol and 1:4 bis(hydroxymethyl)cyclohexane, and
      3. the alkali metal or alkaline earth metal salt(s) of dimethyl-5-sulfo-isophthalate, from about 0.5 to 10 structural units per 100 total structural units of said fiber-forming material of said copolyester being organic radicals derived from said alkali metal or alkaline earth metal salts of dimethyl-5-sulfoisophthalate; and b. said copolyester is physically admixed with from about 1 to about 15 weight based upon the weight of the total mixture percent of a double end-capped alkyl terminated poly (ethylene oxide) which has a molecular weight of from 500 to 20,000.

2. The fiber of claim 1, wherein said acid is terephthalic acid and said glycol is ethylene glycol.

3. The fiber of claim 2, wherein said metal is sodium.

4. The fiber of claim 3, wherein said alkyl is methyl and said methyl terminated poly(ethylene oxide) has a molecular weight of about 1540.

* * * * *